United States Patent [19]
Smith, Jr.

[11] 3,730,731
[45] May 1, 1973

[54] ROASTING METHOD FOR PARTICULATE SOLIDS
[75] Inventor: Horace L. Smith, Jr., Richmond, Va.
[73] Assignee: Smitherm Industries, Inc., Richmond, Va.
[22] Filed: Apr. 26, 1971
[21] Appl. No.: 137,247

Related U.S. Application Data
[63] Continuation-in-part of Ser. No. 44,464, June 8, 1970, Pat. No. 3,615,668.

[52] U.S. Cl. ..........................99/68, 34/10, 34/57, 34/109, 99/26, 99/81, 99/126
[51] Int. Cl. ...............................................A23f 1/02
[58] Field of Search.....................99/68, 81, 26, 126, 99/236; 34/10, 22, 33, 57, 109, 56

[56] References Cited
UNITED STATES PATENTS
3,149,976  9/1964  Smith, Jr. ................................99/68
3,615,668  10/1971  Smith, Jr. ................................99/68

Primary Examiner—Frank W. Lutter
Assistant Examiner—William L. Mentlik
Attorney—Strauch, Nolan, Neale, Nies & Kurz

[57] ABSTRACT

A method for roasting particulate solids which includes a system for heating and circulating a fluid through a roasting vessel, and arrangements for supplying material to be processed to and discharging it from the reactor.

7 Claims, 6 Drawing Figures

Patented May 1, 1973

INVENTOR
HORACE L. SMITH, JR.

BY Strauch, Nolan, Neale, Nies & Kurz
ATTORNEYS

FIG. 1B

Patented May 1, 1973

| | |
|---|---|
| GREEN BEANS INTO FEED LOCK 24 | 1 |
| EVACUATE AIR FROM LOCK 24 TO 2"Hg | 2 |
| PRESSURIZE LOCK 24 WITH $N_2$ | 3 |
| GREEN BEANS INTO ROASTER 22 | 4 |
| VENT LOCK 24 TO 30"Hg $N_2$ | 5 |
| EVACUATE LOCK 24 TO 2"Hg $N_2$ | 6 |
| ROASTED BEANS INTO DISCHARGE LOCK 30 | 7 |
| VENT LOCK 30 TO 30"Hg $N_2$ | 8 |
| EVACUATE LOCK 30 TO 2"Hg $N_2$ | 9 |
| ROASTED BEANS INTO COOLER 84 | 10 |
| EVACUATE AIR FROM LOCK 30 TO 2"Hg | 11 |
| PRESSURIZE LOCK 30 WITH $N_2$ | 12 |
| INDEX ROTATABLE ASSEMBLY 58 ONE INCREMENT | |

CYCLE TIME-SECONDS

INVENTOR

HORACE L. SMITH, JR.

BY Strauch, Nolan, Neale, Nies & Kurz

ATTORNEYS

ROASTING METHOD FOR PARTICULATE SOLIDS

This application is a continuation-in-part of my copending application Ser. No. 44,464 filed June 8, 1970, for Method And Apparatus for Roasting Particulate Solids now U.S. Pat. No. 3,615,668.

The present invention relates to the processing of particulate solids and, more specifically, to the roasting of coffee beans and comparably processable solids.

In application Ser. No. 44,464, I disclosed certain novel methods of an apparatus for roasting coffee and comparably processable solids which had a number of advantages over the roasting techniques theretofore available. Specifically, the novel technique disclosed in my copending application provides uniform treatment of the solids being processed, versatility, accurate process control, a high rate of heat transfer, and reduced power requirements. At the same time these advantages can be achieved at lower cost and with less complex equipment than was therefore possible by use of the only technique known to me to be capable of providing similar advantages.[1] ([1.] See U.S. Pat. Nos. 3,328,172; 3,328,894; 3,329,506; 3,332,780; 3,385,199; 3,395,634; 3,408,920; 3,447,338; 3,345,180; and 3,345,181.)

It is the primary object of the present invention to provide improved methods of and apparatus for roasting coffee and comparably processable solids which equal or better the performance of, but are even less complex and more economical than, the methods and apparatus disclosed in my copending application.

In the present invention, the solids being processed are roasted in much the same manner as disclosed in that application. That is, the solids to be processed are introduced into and discharged from a reactor or roasting vessel through devices designed to prevent the egress of roasting fluid and the ingress of air so that an atmosphere of controlled composition and/or an above-atmospheric pressure can be maintained in the reactor. The solids thus introduced into the reactor are formed into a bed with successive increments of the introduced solids being confined to specific locations in the bed. This bed is displaced to move the solids from the location at which they are introduced to the location where they are discharged.

As the bed is displaced, the solids are roasted by a heated fluid, which will typically be an inert gas such as nitrogen. The roasting fluid is directed upwardly through the bed, typically through inclined apertures in a stationary nozzle plate located in the lower reaches of the reactor. This causes the solids being roasted to circulate in a pattern which produces uniform and intimate contact between the fluid and the particulate solids and a consequent uniform roasting of the solids.

The roasting process and apparatus disclosed herein differ in one respect from those described in my pending application in the manner in which the displacement of the bed of solids being processed is effected; they also differ in the manner in which the solids are introduced into and removed from the bed. In the earlier disclosed method and apparatus, the bed of solids is continuously in motion. This necessitates the use of relatively complex and expensive devices to provide a continuous flow of solids to be processed into the reactor or roasting vessel and a continuous flow the roasted solids therefrom.

In the present invention, in contrast, the bed is alternately incrementally advanced and halted in moving the solids from the location at which they are introduced to the locations where they are removed.[2] ([2.] In typical application of the invention, the cycles of movement of the bed are uniform. This permits successive segments of the bed to be moved through the roasting path in periods of equal duration; (i.e., at the same speed) to produce uniform roasting.) For reasons which will become apparent hereinafter, this novel method of advancing the bed permits the solids to be introduced and removed from the bed while it is halted. As a result, much simpler feed and removal devices can be employed.

More particularly, the novel method of displacing the bed of solids just described permits simple gastight locks to be substituted for the relatively complex feeders disclosed in my earlier application. The roasted solids in one segment of the bed are discharged therefrom while the bed is halted into one lock. At the same time unroasted solids are transferred from a second lock into the bed to replace the previously discharged segment. Also, in preferred embodiments of the invention, air is evacuated from the locks and replaced with roasting fluid in an appropriate sequence, and the roasting fluid is then evacuated from the locks and returned to the fluids circulating system. This permits both the ingress of air into the roasting vessel and the loss of roasting fluid to be minimized. As a consequence, the solids can be roasted in the preferred manner in an atmosphere of controlled composition and/or at an above-atmospheric pressure. This allows the beans to be processed without oxidative degradation and, in the case of less expensive beans, under conditions which will materially upgrade their quality.

Aside from those discussed above, the novel roasting technique described herein has the advantages of using relatively inexpensive sources of inert roasting fluids and a simple system for heating the roasting fluid. Also, the fluid circulation system is simple; and the moisture content of the roasting fluid can be regulated without venting fluid from the system. The last feature is important because it eliminates the loss of roasting fluid and sensible heat associated with venting, the hardware required for venting, and the hardware needed to eliminate pollutants from the vented fluid.

Further, in the present invention, the cyclic depressurization and repressurization associated with the unloading and loading of the reactor and other components in the fluid circulating system of batch-type apparatus is eliminated. The apparatus can consequently be made much simpler since the hardware needed to effect depressurization and repressurization is eliminated.

The primary object of the invention has been identified above. Other important but more specific objects of the invention include the provision of novel, improved methods of and apparatus for roasting coffee and comparably processable solids:

1. by a continuous as opposed to batch-type technique.
2. by a technique which provides a uniform product, is versatile, and has high effeciency.

3. in which the solids can be roasted in an atmosphere of controlled composition or controlled composition and above-atmospheric pressure.
4. in which, in conjunction with the preceding object, gastight locks are employed in introducing solids to be roasted into a roasting vessel and in removing roasted solids from the vessel to keep air from entering the vessel and to prevent the escape of roasting fluid.
5. in which, in conjunction with the preceding object, a bed of solids being roasted is alternately advanced and halted and in which the solids are introduced into and removed from the bed while it is halted to thereby simplify the steps of introducing the solids into and removing them from the roasting vessel.

Still other important objects and features and further advantages of the invention will become apparent from the appended claims and as the ensuing detailed description and discussion proceeds in conjunction with the accompanying drawing, in which:

Figures 1, 1A:
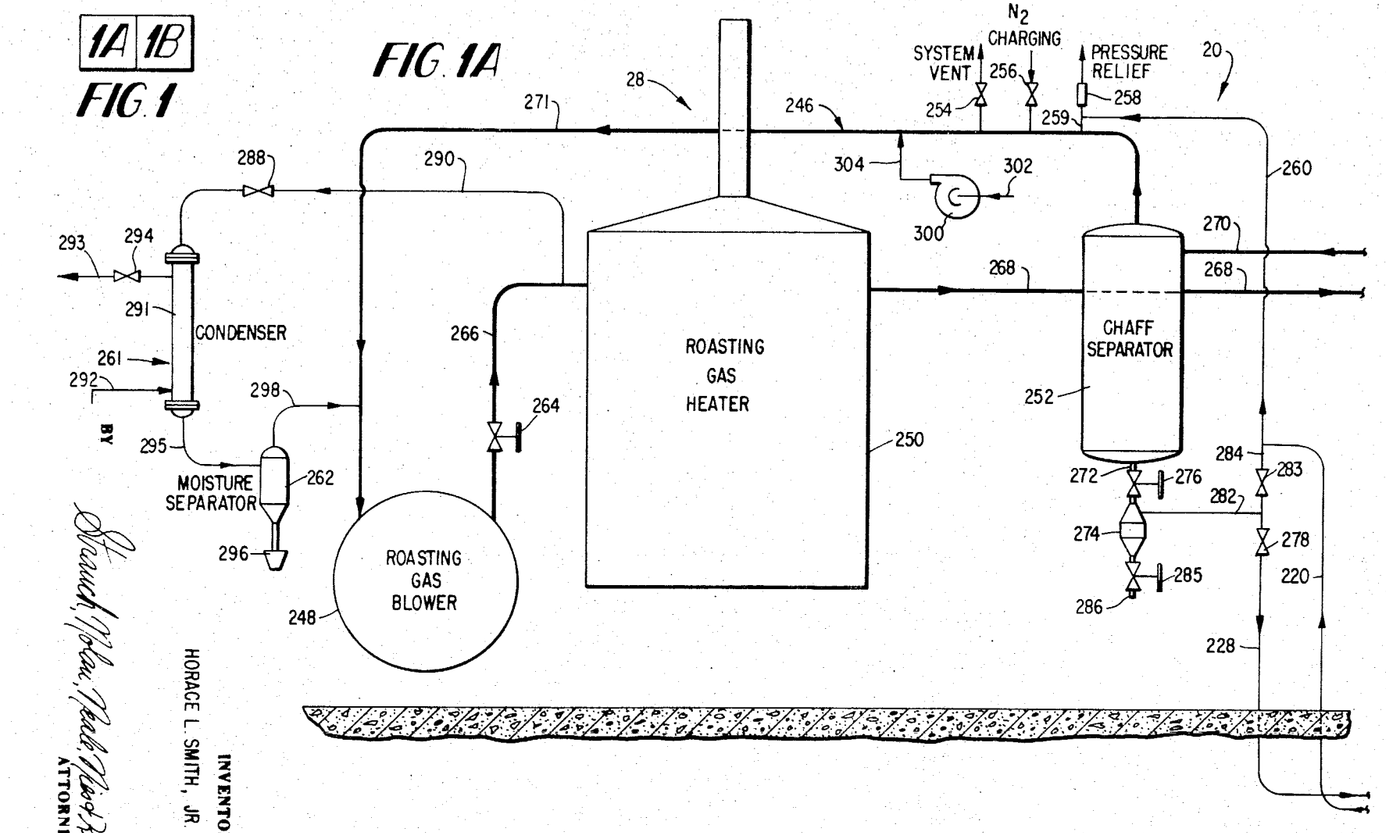
FIG. 1 shows the relationship between FIGS. 1A and 1B which together constitute a schematic illustration of a system or plant for roasting particulate solids, the plant being constructed in accord with the principles of the present invention and being designed specifically for coffee roasting.
Figure 1B:
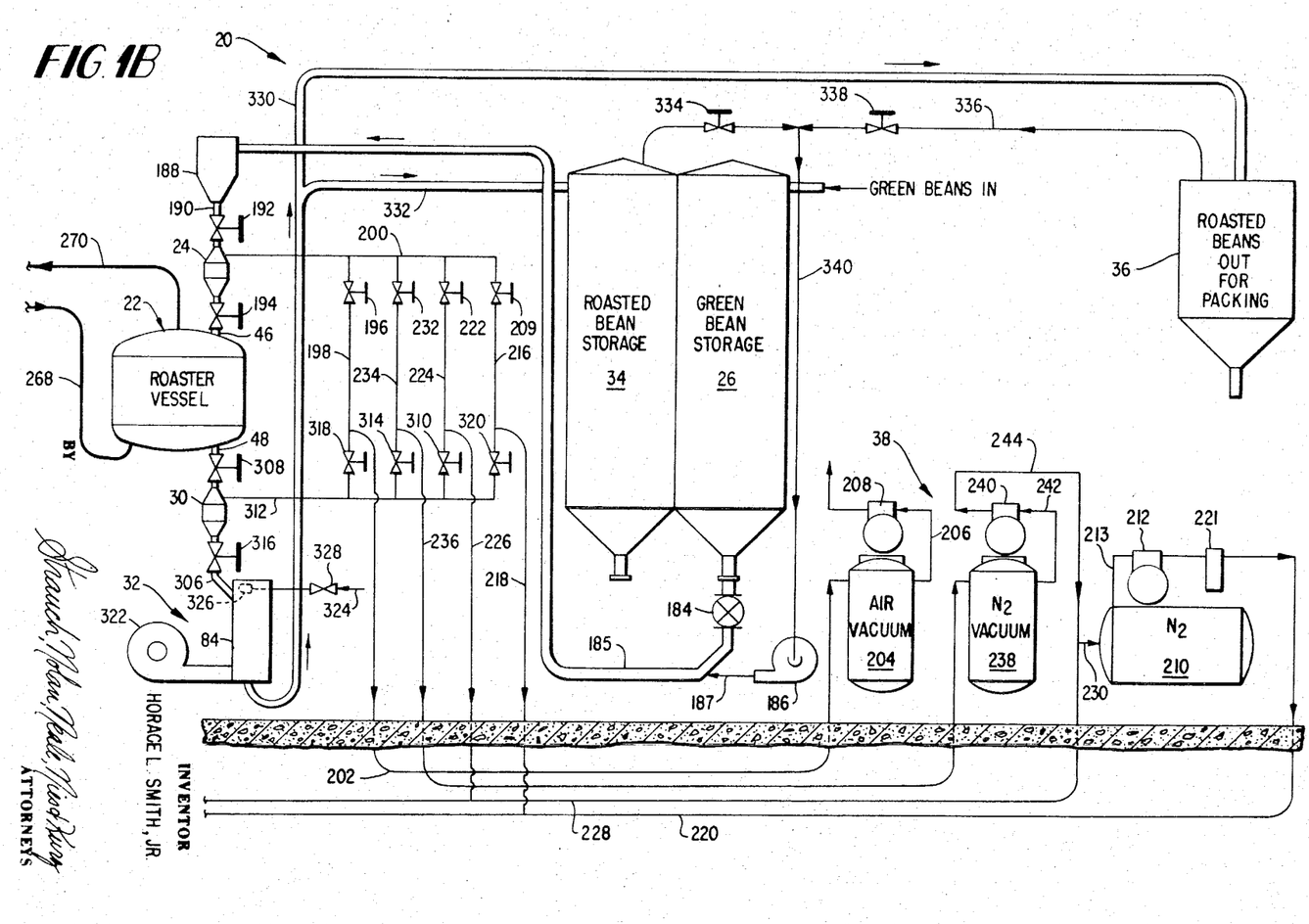

Referring now to the drawing, FIGS. 1A and 1B depict diagrammatically a coffee roasting plant or system 20 constructed in accord with the principles of the present invention.[3] ([3.] Coffee roasting plant 20 may equally well be employed to roast other products including those mentioned in application Ser. No. 44,464.) System 20 includes a roasting or reaction vessel 22 into which unroasted beans are introduced or fed from a gastight lock 24 supplied with green beans from a storage hopper 26. Lock 24 is employed to maintain isolation between the interior of the reactor and the ambient atmosphere while the solids are introduced and to remove from the solids any air mixed with them.

The solids thus introduced into the vessel are roasted by a fluid which is heated in and circulated through the roasting vessel or roaster by a fluid heating and circulating system 28.

The system also includes a second gastight lock 30 through which roasted beans are discharged from the roasting vessel to a cooling system 32. Lock 30, like lock 24, isolates the roasting vessel from the surrounding environment while the transfer of solids is effected.

In cooling system 32, the roast is quenched and the roasted beans cooled. The beans are then typically transferred to a storage bin 34 or to packaging equipment exemplified by hopper 36.

Another important part of plant 20 is a system 38 which is employed to control the environment in locks 24 and 30 and keep air from entering or roasting fluid from escaping from roasting vessel 22 as unroasted solids are introduced into or roasted solids discharged from roasting vessel 22. This conserves the roasting fluid and allows the solids to be roasted in an environment of controlled composition or controlled composition and above-atmospheric pressure.

Other major components of the plant include a novel arrangement 40 (see FIGS. 2 and 4) for driving the moving components of roasting vessel 22 and a control system for regulating the operation of plant 20. The drive arrangement is of particular importance as it permits the uncomplicated locks 24 and 30 to be employed in the stead of the more complex solids transfer devices disclosed in application Ser. No. 44,464.

Figures 2, 3:
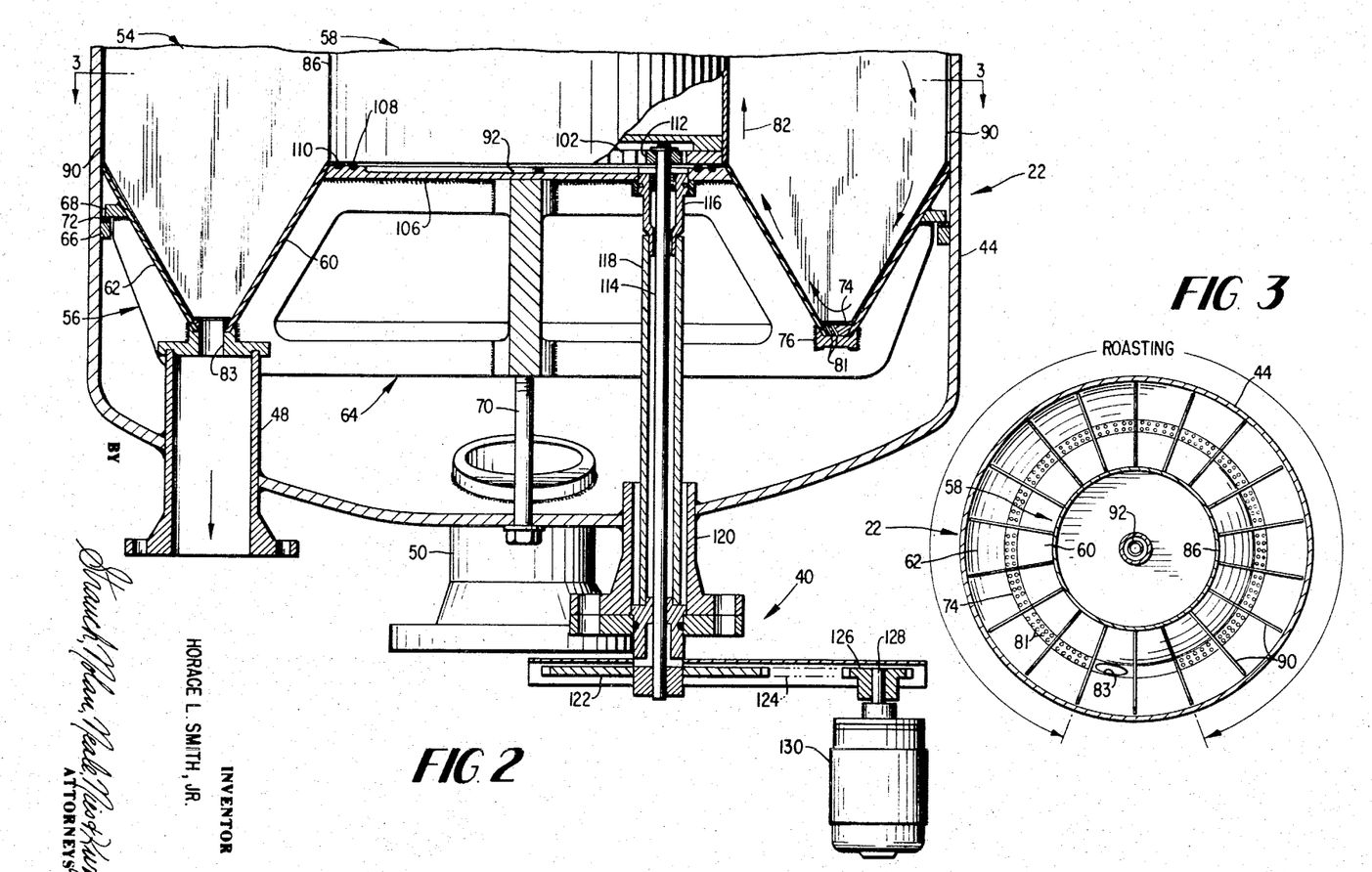
FIG. 2 is a vertical section through the lower part of a reactor or roasting vessel employed in the system of FIG. 1.
FIG. 3 is a section through the roasting vessel of FIG. 2 to a reduced scale and is taken substantially along line 3—3 of the latter Figure.

As indicated above, one of the primary components of roasting system 20 is reaction vessel 22. This vessel is illustrated in FIGS. 2 and 3 and described in detail in application Ser. No. 44,464 which is hereby incorporated herein and to which reference may be made if deemed necessary.

Referring now to the Figures just mentioned, reaction vessel 22 has a vertically oriented, cylindrical shell 44. As the fluid-solids treatment of this invention can advantageously be carried out under pressure, reaction vessel shell 44 is preferably constructed to withstand pressures up to several hundred pounds per square inch.[4] ([4.] For coffee roasting, pressures on the order of 130–150 psig have proved advantageous in many cases. However, as described in my U.S. Pat. No. 3,145,180 issued Oct. 3, 1967, for COFFEE ROASTING METHODS, which is also intended to be incorporated by reference herein, pressures on the order of 300 psig can also be used to advantage.)

Solids to be roasted are introduced into roasting vessel 22 through a transfer conduit 46 which extends between supply lock 24 and the roasting vessel. Roasted solids are discharged from the roasting vessel through a discharge transfer conduit 48 which extends through the lower end of shell 44 and communicates with lock 30.

Roasting vessel 22 also includes an inlet 50 for a heated roasting fluid in the lower end of shell 44. The roasting fluid flows upwardly through vessel 22 from inlet 50 and is discharged through an outlet (not shown) into fluid circulating system 28. As the fluid flows through the vessel, it roasts the beans or other solids in the vessel, which are formed into a bed by a solids transfer and fluid distributing arrangement identified generally by reference character 54.

The arrangement 54 just mentioned includes a first, fixed assembly 56 supported from reactor shell 44 and a second assembly 58 rotatable about an axis coincidental with the vertical centerline of roasting vessel 22. Fixed assembly 56 includes a frustoconical, upwardly and inwardly inclined inner support 60 and a frustoconical, upwardly and outwardly inclined outer support 62,[5] ([5.] The angle of inclination for both supports will typically be on the order of 60° although this precise angle is not critical.) both supported from a spider 64, the details of which are unimportant in the practice of the present invention.

The assembly of inner and outer supports 60 and 62 and spider 64 is supported from reactor shell 44 by an annular bracket 66 fixed to the reactor shell, an annular flange 68 on spider 64 being seated on the bracket. Assembly 56 is fixed in place by a fastener 70 which extends upwardly through the bottom of the reaction vessel and is threaded into the spider. An annular seal 72 between bracket 66 and flange 68 prevents the roasting fluid from flowing through the joint between these two components into the upper portions of the reaction vessel.

Also included in fixed assembly 56 is an orifice ring or plate 74, which spans the gap between the lower ends of inner and outer supports 60 and 62. The orifice ring is supported from spider 64 by a support ring 76 to which the ring is secured. Flow passages (not shown) are formed at intervals through support ring 76. As shown in FIGS. 2 and 3, apertures 81 are provided in orifice ring 74 in a regular pattern or array (typically in two rows) except in location below bean inlet conduit 46 and above bean discharge conduit 48. The apertures are inclined towards the center of the reaction vessel.

Roasting fluid enters reactor 22 through inlet 50 and then flows upwardly through the flow passages in support ring 76 and the apertures 81 in orifice ring 74 and the bed of beans, causing the beans to circulate in the pattern shown by arrows 82 in FIG. 2.[6] ([6] In one 28 inch diameter roasting vessel constructed in accord with the principles of the present invention apertures 81 are 0.136 inch in diameter. Two rows of apertures inclined at an angle of 60° from the horizontal and spaced 0.25 inch on centers re formed are the orifice ring.) As discussed above and in my issued U.S. Pat. No. 3,345,180, circulation of the beans being roasted is of considerable importance as this provides uniform and intimate contact between the roasting fluid or gas and the solids being processed. Such contact results in the production of a uniform product and also provides versatility, accurate process control, a high rate of heat transfer to the solids, and other advantages.

As indicated above, no apertures are formed in the portion of orifice ring 74 below inlet conduit 46 or above solids discharge conduit 48. In the first of these locations, the orifice ring is solid or imperforate. Accordingly, solids fed into the roasting vessel through inlet conduit 46 may flow into fixed assembly 56 without disturbance by the roasting fluid.

In the portions of orifice ring 74 and support ring 76 above discharge conduit 48, a dump opening 83 is formed. Accordingly, as the solids being processed reach this portion of the orifice ring (the manner in which solids are transferred around the reaction vessel will be described shortly), they flow through the dump opening into discharge conduit 48 for transfer to the cooler or cooling vessel 84 of solids cooling system 32 as described previously.

As discussed briefly above, in the present invention solids to be roasted are introduced into reaction vessel 22 through inlet conduit 46, displaced in a circular path around the vessel, and discharged through conduit 48. As the solids move around the vessel the desired roasting is accomplished by the fluid introduced into the vessel through inlet 50.

It is the function of the second, movable or rotatable assembly 58 to rotate or turn the bed of solids and thereby displace the solids through the path just described. Rotatable assembly 58 includes a vertically extending, cylindrical inner member or sleeve 86 to which a conical cap (not shown) is attached. Fixed to sleeve 86 at equidistant intervals are radial blades or paddles 90. These blades extend from above fixed assembly 56 downwardly into the frustoconically sectioned trough between inner and outer supports 60 and 62. The lower portions of the blades are shaped to match the configuration of the trough.

Blades 90 divide the bed of solids being roasted into a number of distinct portions or segments. By rotating assembly 58, each of these segments or portions of the bed can be caused to move from a position beneath inlet conduit 46 where the segments are formed by the introduction of solids into the reaction vessel through a circular path to opening 83, where the solids are dumped into discharge conduit 48.

Sleeve 86 is rotatably supported from the spider 64 of fixed assembly 56 by a pivot member 92. This member extends upwardly through and is fixed to the sleeve in the manner described in application Ser. No. 44,464.

Fixed in the lower end of sleeve 86 is an internal ring gear 102. Ring gear 102 (and thus sleeve 86 and blades 90) is rotatably supported from the uppermost member 106 of spider 64 by bearings 108, which will typically be of the ball type. An annular seal 110 between spider member 106 and ring gear 102 assists in confining the roasting fluid to the chamber between movable assembly 58 and reaction vessel shell 44 in which the roasting occurs.

As indicated previously, movable assembly 58 is rotated by drive arrangement 40. Drive 40 includes a pinion 112 in mesh with ring gear 102. The pinion is fixed to a shaft 114 which extends downwardly through a fitting 116, a sleeve 118, and a substantially gastight fitting 120 to the exterior of reaction vessel 22. Fixed to the lower end of shaft 114 is a gear 122 drive-connected as by a chain 124 to a pinion 126. This pinion is fixed to the output shaft 128 of a drive motor 130.

Figure 4:
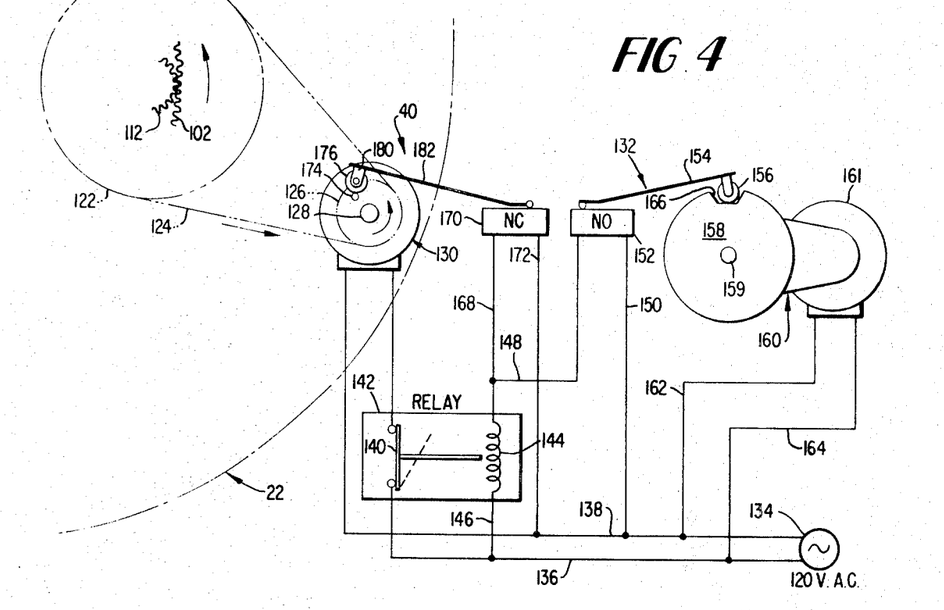
FIG. 4 is a schematic illustration of an arrangement for rotating a movable assembly which is employed in the roasting vessel to displace a bed of solids being roasted.

Referring now to FIG. 4, the drive 40 for motor 130 also includes a control system 132 for regulating the motor operation. More specifically, it is the function of control system 132 to so regulate the operation of motor 130 as to alternately advance or rotate assembly 58 through a preselected angle and then halt it for a period of specified duration. As was also explained previously, this permits the relatively simple air locks 24 and 30 to be employed to feed the solids to and transfer them from roasting vessel 22 while keeping air from flowing into and roasting fluid from flowing out of the roasting vessel.

As shown in FIG. 4, motor 130 is connected across a source of operating voltage 134 by leads 136 and 138. Interposed in lead 136 is the normally open contact 140 of a relay 142 which also has a coil 144. With relay 142 deenergized, no power is supplied to motor 130.

Relay coil 144 is also connected across power source 134 by lead 138 and by leads 146, 148 and 150. The latter two leads are connected through a normally open switch 152 having an actuator 154 to which a cam follower 156 is attached. Accordingly, this circuit is normally not energized.

Cooperating with cam follower 156 is a disclike cam 158. The cam is secured to the timing shaft 159 of a conventional timing device 160, which also includes a motor 161 for rotating shaft 159. Motor 161 is connected across power source 134 by leads 136 and 138 and by leads 162 and 164.

As shaft 159 and cam 158 rotate, a depression 166 in cam 158 moves opposite cam follower 156; and the cam follower drops into this depression. This displaces switch actuator 154, allowing switch 152 to close and connect relay coil 144 across power source 134. As a result, the relay is energized, thereby closing normally open relay contact 140. This, in turn, connects motor 130 across power source 134, energizing the motor, and causing it to rotate assembly 58 through the drive train 40 described previously.

Shortly after it falls into cam depression 166, the follower 156 rides out of depression, opening switch 152. However, relay coil 144 is kept energized through a holding circuit including leads 136, 146 and 168, normally closed switch 170, and leads 172 and 138. Accordingly, motor 130 continues to operate and rotate movable assembly 58 until switch 170 is opened.

This is accomplished by an eccentric cam 174 and a cam follower 176. Eccentric 174 is mounted on the pinion 126 attached to the output shaft 128 of rotatable assembly drive motor 130. Cam follower 176 is rotatably supported as by bracket 180 from the actuator 182 of switch 170; and, with assembly 58 stopped it is in the position illustrated in FIG. 4, holding switch 170 open.

As motor output shaft 128 rotates, the follower drops off eccentric cam 174 and allows actuator 182 to move and close switch 170 so that the holding circuit described above can be completed. After one full revolution, cam 174 again engages follower 176, displacing actuator 182 and opening switch 170. This deenergizes relay 142, relay contact 140 opens, motor 130 is deenergized, and the movement of rotatable assembly 58 ceases.

Figure 5:
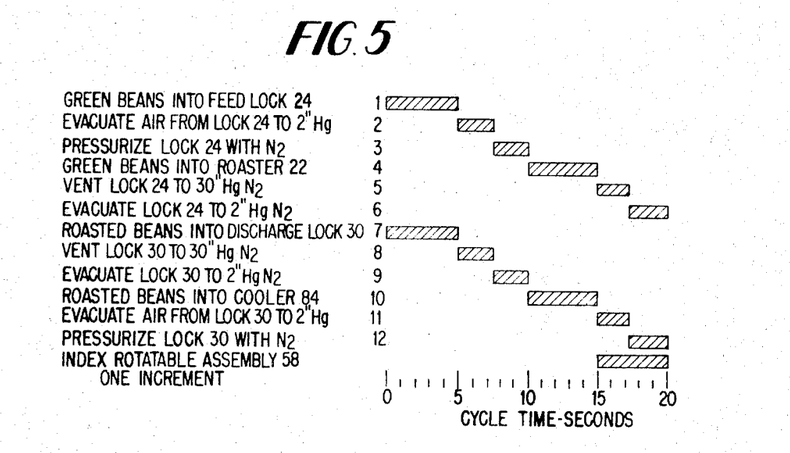
FIG. 5 is a timing diagram for the operation of the coffee roasting system of FIG. 1.

FIG. 5 is a timing chart showing a cycle of movement of rotatable assembly 58 as just described. As shown by this Figure, the advance of assembly 58 will typically take on the order of 5 seconds; and the assembly will then be halted for about 15 seconds. The assembly will typically be advanced about 20° at a time.

It will be apparent from the foregoing that the duration of the roasting cycle is dependent on the speed or rotation of the camshaft 159 — the solids being roasted always move in the same number of increments through the same annular path; and the speed of rotation of the camshaft determines the frequency with which assembly 58 is advanced to incrementally displace the solids. The duration of the roasting cycle can accordingly be readily varied by changing the speed of camshaft rotation.[7] (7. In a typical timing device, this is easily accomplished by changing the gears in the drive train (not shown) between the camshaft and timer motor.) For a 4 minute roast, for example, camshaft 159 of one plant of the type described herein rotates once every 15 seconds. It rotates once every 17.5 seconds for a 4.5 minute roast and once every 18.75 seconds for a 5 minute roast.

As reaction vessel 22 is designed for continuous as opposed to batch-type operation, the beans to be roasted must be introduced into the reaction vessel through a device capable of feeding the beans into the reactor without interrupting the roasting process. In addition, for a satisfactory roast, this must be accomplished in such a fashion that no air will be admitted into the roaster and so that air mixed with the beans being admitted can be separated from them. Otherwise, there may be unwanted oxidation of the means being roasted. Also, to make the system economically practical, the feed device must prevent the inert gas within the reaction vessel from flowing out of it as the beans are introduced because of the expense of the inert roasting fluid.

Similar provisions must be made for discharging the roasted beans from the reaction vessel. That is, this operation must be carried out without interruption of the roasting process and without a significant flow of fluid into or out of the reaction vessel.

As indicated above, because of the novel manner in which the bed of solids being roasted is alternately advanced and halted by drive 40, the relatively simple air lock arrangement illustrated in FIG. 1 may be employed for these purposes. More specifically, lock 24 is a gastight, hopper-like component and is supplied with the beans or other solids to be roasted, typically from a green bean storage bin 26 as discussed above. As shown in the drawing, the beans are fed from bin 26 through a conventional feeder valve 184 into a pneumatic feed line 185. A blower 186 connected to the feed line by air line 187 forces the beans through the feed line to a conventional cyclone 188 where chaff, dirt, and other foreign matter is separated from the beans. From the cyclone the beans flow through conduit 190 into lock 24.

Referring now to both FIGS. 1B and 5, a valve 192 is interposed in lock supplying conduit 190, and a valve 194 is disposed in the conduit 46 through which the beans to be roasted are transferred from lock 24 to roasting vessel 22. Initially, valve 194 is closed; and valve 192 is opened, allowing the beans to flow into lock 24. Valve 192 is then closed, isolating the lock from both the roasting vessel and the ambient surroundings. The lock is then evacuated to remove from the beans any air mixed therewith. As mentioned above, the removal of air from the unroasted beans is important because it allows the beans to be roasted in an environment of controlled composition in which they will not be subject to oxidative degradation.

Evacuation of lock 24 is accomplished by opening a valve 196 in a vacuum line 198 connected to roasting vessel 22 by line 200 and through line 202 to a vacuum accumulator 204. The latter is in turn connected through line 206 to a vacuum pump 208. Accordingly, with valves 192 and 194 closed and valve 196 open, the air in lock 24 flows through lines 198, 200 and 202 into accumulator 204 from which it is evacuated by pump 208. The foregoing sequence of events is shown in the timing diagram of FIG. 5 as steps 1 and 2.

It is not essential that a vacuum accumulator be used. However, the latter arrangement is preferred as it permits a much smaller and correspondingly less expensive pump to be used. Specifically, a complete cycle of loading and unloading the reaction vessel occupies only approximately 15–20 seconds, and the step of evacuating lock 24 must be accomplished in between 2 and 3 seconds. If an accumulator is not employed, a pump having a sufficiently large capacity to empty lock 24 in a 2-3 second period must be provided. On the other hand, if an accumulator is employed, a much smaller pump can be used and operated continuously during the cycle to evacuate from the accumulator the air discharged into it.

At the end of the evacuation step, valve 196 is closed and the pressure in lock 24 equalized with that in the roasting vessel by filling the lock with roasting fluid (typically nitrogen) to system pressure. This is accomplished by opening a valve 209 and pumping nitrogen into the lock from a tank or accumulator 201 by a compressor 212. More specifically, nitrogen in tank 210, typically at approximately atmospheric pressure, is withdrawn through line 213 by the compressor and compressed to system pressure. Valve 209 is interposed in a line 216 connected between the forementioned line 200 and a line 218 which is connected by line 220 to compressor 212. Accordingly, when valve 209 is opened, the compressed nitrogen flows through filter 221 and line 220 into the lock until the system pressure is reached.[8] ([8.] In a typical application of the invention, the pressure in the lock at the start of the nitrogen filling step will be on the order of 2 inches of mercury.) Again, as shown by FIG. 5, this step is typically accomplished in only slightly more than 2 seconds.

After pressurization, valve 209 is closed and valve 194 opened. This allows the deareated beans to be discharged by gravity from lock 24 into the roasting vessel and into the space between two adjacent blades 90 of rotatable assembly 58 to form one segment of the bed of solids in the roasting vessel.

To complete the cycle of operation of lock 24, valve 194 is closed and the nitrogen evacuated from the lock and returned to tank 210 to conserve it. As indicated above, this is an important facet of the invention from the point-of-view of operating economy.

It has also been found that significant operating economies can be achieved in removing the nitrogen from lock 24 by doing this in two stages. In the first stage, the lock at system pressure, typically on the order of 140 psig, is connected to tank 210 by opening a valve 222 in a branch line 224 connected through line 200 to lock 24 and through lines 226, 228 and 230 to tank 210. The bulk of the nitrogen in lock 24 flows into tank 210 under its own pressure in this step. As shown by FIG. 5, this initial venting step will typically be completed in about 5 seconds.

In the second stage of the nitrogen removal step, the remaining nitrogen in the lock is evacuated. More specifically, valve 222 is closed and a valve 232 in a branch line 234 opened. This connects lock 24 through line 200, line 234, and line 236 to nitrogen accumulator 238.[9] ([9.] As in the case of the air evacuating system, the accumulator is not essential. However, it is preferred that an accumulator be employed for the reasons discussed in conjunction with the air evacuation system.) The accumulator is maintained at a high vacuum (typically on the order of 2 inches of mercury) by constantly operating vacuum pump 240, which is connected to the accumulator by line 242. Accordingly, there is a rapid of flow of nitrogen from lock 24 into accumulator 238, this stage of the evacuation step typically being accomplished in between 2 and 3 seconds.

As shown in FIG. 1B, pump 240 pumps the nitrogen thus returned to accumulator 238 through line 244 into line 230 and thence back into tank 210.

Following the evacuation of nitrogen from lock 24, valve 232 is closed, and valve 192 is opened. This completes the cycle and readies lock 24 for a further charge of solids to be roasted.

The solids introduced into roasting vessel 22 in the manner just described are roasted by heating a roasting fluid and circulating the heated fluid upwardly through them in the manner described previously in conjunction with the discussion of the operation of roasting vessel 22. Referring again to FIG. 1, the system 28 provided in plant 20 for heating and circulating the inert roasting gas or fluid includes a main loop 246.

Interposed in loop 246 are a circulator 248 for circulating the heated gas through system 28 and reactor 22, a direct fired heater 250 for the gas, and a chaff separator 252. Also included in main loop 246 on the discharge side of reaction vessel 22 is a valve 254 which can be opened to vent system 28, the reaction vessel, and the system 38 which supplies fluid to the various locks and closed to isolate the vessel and fluid system from the ambient atmosphere. Adjacent valve 254 are a valve 256 which can be opened to charge the system with the roasting fluid[10] ([10.] To make repairs, for example, the roasting fluid can be vented from plant 20 through valve 254 into a suitable receiver. Upon resuming operation air can be purged from plant 20 by leaving valve 254 open and introducing roasting fluid through valve 256 to sweep air from the system (air can also be evacuated by connecting valve 254 to a vacuum producer). The system can then be recharged through valve 256. The system can be similarly purged and filled with roasting fluid on initial start-up.) and a pressure relief valve 258.[11] ([11.] As it is connected to loop 246 by line 259, valve 258 prevents excessive pressure build-up in fluid system 28 and in roasting vessel 22. It also prevents excessive pressure from building up in the system 38 utilized to fill locks 24 and 30 with roasting fluid by virtue of its connection to line 220 through lines 259 and 260.) System 28 additionally includes a condensor 261 and separator 262 by which water may be removed from the recirculated roasting fluid to maintain the moisture content of the fluid at a specified level and a main flow control valve 264 for regulating the rate-of-flow of the roasting gas.

System 28 is similar to the corresponding fluid heating and circulating system described in my copending application Ser. No. 44,464 and possesses the advantages of the latter. These include simplicity and low initial and operating costs, due both to the relatively small volume of roasting fluid required and the fact that a relatively simple direct fired heater can be used.

As shown in FIG. 1, blower 248 circulates the roasting fluid at a rate determined by the positioning of valve 264 through line 266 to heater 250 where the fluid is heated to the desired temperature, typically on the order of 400+°F. From here the heated fluid flows through line 268 to roasting vessel 22 and then through the latter in the manner described previously. The roasting fluid, then at a lower temperature and having admixed therewith moisture and other volatiles evolved from the beans during the roasting process, foreign matter, etc. flows through line 270 to chaff separator 252, which is of conventional construction and accordingly will not be described in detail herein. Here chaff and other foreign material is separated from the roasted solids. The cleaned roasting fluid flows from the chaff separator through line 271 back to blower 248 to complete the cycle.

Because system 28 is pressurized and filled with inert fluids there is interposed in the chaff discharge or dump conduit 272 from the chaff separator an arrangement which allows foreign material to be discharged without a significant flow of air into or inert gas from the separator. This arrangement preferably includes a lock 274 of the same type as the lock 24 described previously. A valve 276 in chaff dump conduit 272 is normally open, and lock 274 (which is first evacuated) is at the same pressure as chaff separator 252. Accordingly, foreign materials separated in the latter fall by gravity into lock 274.

When lock 274 is full, valve 276 is closed; and a valve 278 in line 228 is opened. This connects the lock through lines 282, 228, and 230 to tank or receiver 210;[12] ([12] A valve 283 in a line 284 connected between line 228 and pressure relief line 260 to prevent excessive pressure buildup in chaff separator 252 is also closed. This keeps the fluid in circulating system 28 and in the pressure relief line from flowing back to tank 210 through lines 284, 228, and 230.) and the roasting fluid flows back to tank 210 until the pressure in the lock reaches atmospheric pressure. Next, a valve 285 in the discharge conduit 286 from lock 274 is opened; and the chaff flows by gravity from the lock. As the pressure on both sides of the lock is equal at this point, there is no appreciable flow of roasting fluid from or flow of air into lock 274. After the lock is emptied, valves 285 and 278 are closed and valves 276 and 283 opened; and the collection of chaff in lock 274 is resumed.

As mentioned above, moisture evolved in the roasting process must be continuously removed from the recirculated roasting gas in typical applications of my invention to prevent the moisture content of the latter from exceeding a preselected level. Regulation of the moisture level is accomplished by circulating a portion of the roasting gas through condensor 261 and separator 262 to remove excess moisture from the recirculating fluid. A valve 288, typically automatically controlled (the control arrangement is not shown), is preferably provided to regulate the volume rate-of-flow of gas from line 266 through line 290 to the condensor and, accordingly, the amount of moisture which is removed.

Condensor 261 is of conventional construction and accordingly will not be described in detail herein. Briefly, however, it includes a shell 291 housing a coil (not shown) to which a coolant is circulated by line 292 and from which the coolant is discharged through line 293 at a rate controlled by a valve 294 in the coolant discharge line. The roasting fluid flows through shell 291 over the coil. This lowers its temperature, condensing the water vapor in the fluid.

From the condensor the roasting fluid with its burden of condensed moisture flows through line 295 to moisture separator 262, which may also be conventional construction. Here, the condensed moisture is separated and discharged through a trap 296 which keeps air from flowing into the fluid circulating system.

The roasting fluid from which the moisture has been separated flows through line 298 to line 271 where it is mixed with the roasting fluid flowing directly to blower 248 through the latter. This permits the moisture content to be accurately controlled.

In some cases the moisture content of the fluid supplied by blower 248 to roasting vessel 22 may be too low rather than too high. To cover this contingency, a pump 300 connected to a source of water (not shown) through line 302 and to fluid line 271 by line 304 may be provided. If the moisture content of the recirculated fluid becomes too low or is too low on start-up, for example, pump 300 can be energized (preferably automatically) to pump water into line 271 and bring or restore the moisture content of the recirculated fluid to the desired level.

Referring again to FIGS. 1 and 5, I have thus far described how the beans or other solids are introduced into and roasted in roasting vessel 22. At the completion of the roasting step, the roasted solids are discharged through dump opening 83 into transfer conduit 48 and through the transfer conduit into discharge lock 30 as discussed above. The discharge lock, which may be of the same construction as feed lock 24, is also connected to the cooler 84 of cooling system 32 by a transfer conduit 306.

To transfer roasted solids from roasting vessel 22 to lock 30, a valve 308 in transfer conduit 48 is opened, filling lock 30 with roasting fluid and equalizing the pressure in the lock with that in the roasting vessel. This allows the beans flowing into conduit 48 through dump opening 83 to fall by gravity into the lock. Valve 308 is then closed, isolating the lock.

The nitrogen or other roasting fluid is then evacuated from the lock to conserve it, preferably in two stages as discussed above in conjunction with feed lock 24. Specifically, valve 310 is first opened. This connects lock 30 with the atmospheric pressure tank or receiver 210 through lines 312, 224, 226, 228 and 230. The nitrogen in lock 30 accordingly flows under its own pressure into tank 210. As shown in FIG. 5, this stage of the nitrogen evacuation step typically takes on the order of 2 to 3 seconds.

Valve 310 is then closed and a valve 314 opened, connecting the lock through lines 312, 234 and 236 to the evacuated nitrogen accumulating tank or receiver 238. This step, which will also typically take on the order of two seconds, reduces the pressure in the lock to on the order of 2 inches of mercury.

Valve 314 is then closed and the valve 316 in transfer conduit 306 opened. This allows the beans or other solids to flow by gravity from lock 30 through conduit 306 into cooler 84.

In a typical application of the present invention, cooler 84 will be filled with air at slightly above atmospheric pressure. To keep this air from the roasting vessel, valve 316 is next closed and the air evacuated from the lock by opening valve 318.[13] ([13] Although not critical, it is preferred that the four valves 192, 194, 308, and 316 which control the flow of solids into and out of locks 24 and 30 be ball valves. This type of valve presents minimum obstruction to the flow of solids.) This connects the interior of the lock through lines 312, 198 and 202 to the evacuated air receiver 204. This evacuation step also occurs in 2 to 3 seconds.

Valve 318 is then closed and lock 30 repressurized with roasting fluid by opening valve 320. This connects the lock to the outlet side of compressor 212 through lines 220, 218, 216 and 312. Valve 320 is then closed and valve 308 opened to complete the cycle.

The cooling vessel 84 of solids cooling system 32 to which the roasted solids are transferred in the manner just described may be of any desired construction. Typical of those which may be employed is the rotary drum type reactor or cooling vessel described in my U.S. Pat. No. 3,345,180. For reasons of economy, air will typically be employed as the cooling medium; and a blower or circulator 322 will be incorporated in system 32 to circulate the air through cooling vessel 84.

A low overpressure will normally exist in cooler 84. Accordingly, if the cooled beans are discharged directly from the cooler to atmospheric pressure, the beans and chaff in the system may blow about. To avoid this, the beans may be discharged from the cooler through a lock of the type described above (not shown), for example.

As shown in FIG. 1, solids cooling system 32 also includes a water supply line 324 connected interiorly of cooler 84 to conventional spray nozzles 326. As discussed in detail in U.S. Pat. No. 3,345,180, a spray can be employed to quench the roast and thereby prevent overroasting and to minimize roasting losses. A valve 328 is incorporated in the water supply line 324 to regulate the spray rate.

A chaff separator (not shown) may be added to the illustrated cooling system 32 to separate foreign material from the air discharged from vessel 84. This separator may be of the same type as chaff separator 252.

As shown in FIG. 1, the cooled beans can be transferred through conduit 330 to packaging equipment hopper 36. Alternatively, they may be directed through conduit 330 and conduit 332 to the roasted beans storage bin 34.

To direct the solids to storage bin 34, a valve 334 in a line 336 connected between storage bin 34 and packaging equipment hopper 36 is opened and a second valve 338 in the same line closed. This connects bin 34 with the line of conveyor blower 186 through lines 336 and 340, creating a vacuum in the storage bin. This causes air to flow from cooling vessel 84 to bin 34 through conduits 330 and 332 and transport the roasted solids from the cooling vessel to the bin.

To convey the solids to packaging equipment hopper 36 instead of bin 34, valve 334 is closed and valve 338 opened. This connects the inlet of blower 186 to hopper 36, lowering the pressure in it and thereby causing the beans to be pneumatically conveyed from the cooling vessel to the hopper.

Referring again to FIG. 4, valves 192, 194, 196, 209, 222, 232, 308, 310, 314, 316, 318, and 320 are all of the solenoid type and are controlled in the same manner as roasting vessel drive motor 130; i.e., by switches operated by cams (not shown) mounted on timing shaft 159 of timer 160. Timers of this type as illustrated in FIG. 4 are conventional and commercially available; and the timer will accordingly not be described further herein.

It will be obvious to those skilled in the arts to which this invention pertains that many modifications may be made in the embodiment of the invention described above to optimize its performance for particular applications or for other reasons. Furthermore, it will be readily apparent to such persons that the principles of the invention and the illustrated plant and apparatus, particularly the novel reactor or roasting vessel disclosed herein, can be used for applications other than those specifically mentioned. All such applications and modifications of the present invention and the apparatus and processes employing its principles are therefore intended to be covered by the appended claims unless expressly excluded therefrom.

The invention may be embodied in other specific forms without departing from the spirit or essential characteristics thereof. The present embodiment is therefore to be considered in all respects as illustrative and not restrictive, the scope of the invention being Indicated by the appended claims rather than by the foregoing description; and all changes which come within the meaning and range of equivalency of the claims are therefore intended to be embraced therein.

What is claimed and desired to be secured by Letters Patent is:

1. A method of roasting coffee and comparably processable solids, comprising the steps of: forming in a roasting vessel a vertically extending bed of solids having a horizontal cross-section which diverges from an inner boundary to an outer boundary so that said bed has an inner region adjacent the inner boundary which is narrower than an outer region adjacent the outer boundary; introducing solids to be roasted into said bed at a first location; displacing said bed as an entity to thereby move said solids to a second location; roasting said solids by so effecting a flow of a heated fluid upwardly through the divergingly sectioned bed as said solids are moved from said first location to said second location as to cause the solids in the bed to circulate through paths in which they move upwardly in one of said regions of the bed and downwardly in the other of said regions of the bed, thereby producing intimate contact between the solids and the heated fluid and promoting uniformity in the roasting of the solids; removing the roasted solids from the bed at the second location; and discharging the solids from the roasting vessel; said solids being introduced into the roasting vessel by isolating said solids from the surrounding environment; removing from said solids any air mixed therewith; increasing the pressure on said solids to that in the roasting vessel; and, while keeping the sOlids isolated from the surrounding environment, transferring said solids to the roasting vessel; said solids being removed from said vessel by isolating a zone from the ambient surroundings; providing in said zone an atmosphere of the composition and at the pressure in the roasting vessel; transferring the roasted solids from the roasting vessel to said zone; and isolating said zone from the reaction vessel; and said bed being displaced by alternately incrementally advancing and halting it and the solids being introduced into and removed from the bed while the bed is halted to thereby facilitate the introduction of solids into the bed and the removal of solids therefrom.

2. The method of claim 1, together with the step of purging the interior of the roasting vessel of any air therein to preclude oxidative degradation of the solids being roasted by said air.

3. The method of claim 1, wherein the solids are treated by effecting a flow of the heated fluid therethrough at a temperature sufficiently high to evolve moisture from said solids and including the step of recirculating the fluid through the solids and the step of cooling at least a portion of said fluid to a temperature below the boiling point of water at the pressure on the fluid after the fluid exits from but before it is recirculated through said bed to thereby keep the moisture content of said fluid at a selected level.

4. A method of roasting coffee and comparably processable solids, comprising the steps of: forming in a roasting vessel a vertically extending bed of solids having a horizontal cross-section which diverges from an inner boundary to an outer boundary so that said bed has an inner region adjacent the inner boundary which is narrower than an outer region adjacent the outer boundary; introducing solids to be roasted into said bed at a first location; displacing said bed as an entity to thereby move said solids to a second location; roasting said solids by so effecting a flow of a heated fluid upwardly through the divergingly sectioned bed as said solids are moved from said first location to said second location as to cause the solids in the bed to circulate through paths in which they move upwardly in one of said regions of the bed and downwardly in the other of said regions of the bed, thereby producing intimate contact between the solids and the heated fluid and promoting uniformity in the roasting of the solids; removing the roasted solids from the bed at the second location; and discharging the solids from the roasting vessel; said solids being introduced into the roasting vessel by introducing them into a lock isolated from the roasting vessel; isolating the lock from the ambient surroundings; evacuating the lock to remove air therefrom; filling said lock with roasting fluid until the pressure therein is substantially equal to that in the roasting vessel; and, while keeping the lock isolated from the ambient surroundings, providing communication between the lock and roasting vessel and transferring the solids to be roasted from the lock to the roasting vessel; and said bed being displaced by alternately incrementally advancing and halting it and the solids being introduced into and removed from the bed while the bed is halted to thereby facilitate the introduction of solids into the bed and the removal of solids therefrom.

5. The method of claim 4, together with the steps of, after the solids are transferred to the roasting vessel, isolating the lock from the roasting vessel and evacuating the roasting fluid from the lock and returning it to a receiver to thereby conserve said fluid.

6. A method of roasting coffee and comparably processable solids, comprising the steps of: forming in a roasting vessel a vertically extending bed of solids having a horizontal cross-section which diverges from an inner boundary to an outer boundary so that said bed has an inner region adjacent the inner boundary which is narrower than an outer region adjacent the outer boundary; introducing solids to be roasted into said bed at a first location; displacing said bed as an entity to thereby move said solids to a second location; roasting said solids by so effecting a flow of a heated fluid upwardly through the divergingly sectioned bed as said solids are moved from said first location to said second location as to cause the solids in the bed to circulate through paths in which they move upwardly in one of said regions of the bed and downwardly in the other of said regions of the bed, thereby producing intimate contact between the solids and the heated fluid and promoting uniformity in the roasting of the solids; removing the roasted solids from the bed at the second location; and discharging the solids from the roasting vessel; said solids being discharged from the roasting vessel by transferring them into a lock isolated from the ambient surroundings and filled with roasting fluid at substantially the same pressure as the roasting vessel; isolating the lock from the roasting vessel; evacuating the roasting fluid from the lock and returning it to a receiver to thereby conserve said fluid; and thereafter opening the lock and discharging the solids therefrom; and said bed being displaced by alternately incrementally advancing and halting it and the solids being introduced into and removed from the bed while the bed is halted to thereby facilitate the introduction of solids into the bed and the removal of solids therefrom.

7. The method of claim 6, together with the steps of thereafter isolating the lock from the ambient surroundings while keeping it isolated from the roasting vessel; evacuating the lock to remove any air therein; and filling the lock with roasting fluid to a pressure substantially equal to the pressure in the roasting vessel to ready the lock for receipt of a subsequent transfer of roasted solids from the roasting vessel.

* * * * *